(12) United States Patent
Carrender et al.

(10) Patent No.: US 7,180,402 B2
(45) Date of Patent: Feb. 20, 2007

(54) PHASE MODULATION IN RF TAG

(75) Inventors: Curtis Lee Carrender, Morgan Hill, CA (US); Ronald W. Gilbert, Gilroy, CA (US)

(73) Assignee: Battelle Memorial Institute K1-53, Richland, WA (US)

( * ) Notice: Subject to any disclaimer, the term of this patent is extended or adjusted under 35 U.S.C. 154(b) by 57 days.

(21) Appl. No.: 10/928,712

(22) Filed: Aug. 27, 2004

(65) Prior Publication Data

US 2005/0083179 A1   Apr. 21, 2005

Related U.S. Application Data

(63) Continuation of application No. 09/588,997, filed on Jun. 6, 2000, now abandoned.

(51) Int. Cl.
*H04Q 5/22* (2006.01)

(52) U.S. Cl. ............... 340/10.1; 340/10.4; 340/10.5

(58) Field of Classification Search ........... 340/10.1, 340/10.4–10.5, 572.1; 343/44–45, 42, 51, 343/860; 370/278, 480, 282, 313; 342/42, 342/44

See application file for complete search history.

(56) References Cited

U.S. PATENT DOCUMENTS 3,656,069 A   4/1972   Beccone et al. .......... 332/16 R
3,984,835 A   10/1976  Kaplan et al. .......... 343/6.5 SS
4,075,632 A   2/1978   Baldwin et al. ......... 343/6.8 R (Continued)

FOREIGN PATENT DOCUMENTS

WO   WO 00/67373   11/2000

*Primary Examiner*—Wendy R. Garber
*Assistant Examiner*—Nam Nguyen
(74) *Attorney, Agent, or Firm*—Seed IP Law Group PLLC

(57) ABSTRACT

A radio frequency (RF) communication system employs phase-modulated backscatter signals for RF communication from an RF tag to an interrogator. The interrogator transmits a continuous wave interrogation signal to the RF tag, which based on an information code stored in a memory, phase-modulates the interrogation signal to produce a backscatter response signal that is transmitted back to the interrogator. A phase modulator structure in the RF tag may include a switch coupled between an antenna and a quarter-wavelength stub; and a driver coupled between the memory and a control terminal of the switch. The driver is structured to produce a modulating signal corresponding to the information code, the modulating signal alternately opening and closing the switch to respectively decrease and increase the transmission path taken by the interrogation signal and thereby modulate the phase of the response signal. Alternatively, the phase modulator may include a diode coupled between the antenna and driver. The modulating signal from the driver modulates the capacitance of the diode, which modulates the phase of the response signal reflected by the diode and antenna.

10 Claims, 2 Drawing Sheets

U.S. PATENT DOCUMENTS

| | | | |
|---|---|---|---|
| 4,242,663 A | 12/1980 | Slobodin | 340/152 T |
| 4,358,765 A | 11/1982 | Henoch et al. | 343/6.5 SS |
| 4,360,810 A | 11/1982 | Landt | 343/6.5 R |
| 4,724,427 A | 2/1988 | Carroll | 340/572 |
| 4,870,419 A | 9/1989 | Baldwin et al. | 342/50 |
| 4,912,471 A | 3/1990 | Tyburski et al. | 342/42 |
| 4,918,749 A | 4/1990 | Entschladen et al. | 455/327 |
| 4,963,887 A | 10/1990 | Kawashima et al. | 342/44 |
| 5,119,099 A | 6/1992 | Haruyama et al. | 342/51 |
| 5,247,305 A | 9/1993 | Hirata et al. | 342/44 |
| 5,523,749 A | 6/1996 | Cole et al. | 340/825.54 |
| 5,731,691 A * | 3/1998 | Noto | 323/220 |
| 6,046,668 A | 4/2000 | Forster | 340/10.4 |
| 6,079,619 A | 6/2000 | Teraura et al. | 235/380 |
| 6,130,580 A | 10/2000 | Uchida et al. | 330/286 |
| 6,140,924 A | 10/2000 | Chia et al. | 340/572.5 |
| 6,400,274 B1 | 6/2002 | Duan et al. | 340/572.7 |
| 6,738,025 B2 | 5/2004 | Carrender | 343/860 |

* cited by examiner

PHASE MODULATION IN RF TAG

This application is a CON of Ser. No. 09/588,997 file Jun. 6, 2000 is abandoned.

This invention was made with Government support under Contract DE-AC0676RLO1830 awarded by the U.S. Department of Energy. The Government has certain rights in the invention.

FIELD OF THE INVENTION

The present invention relates to radio frequency identification tags (RF tags), and in particular, to RF tags that communicate using phase modulation.

BACKGROUND OF THE INVENTION

Remote communication utilizing wireless equipment typically relies on radio frequency (RF) technology, which is employed in many industries. One application of RF technology is in locating, identifying, and tracking objects, such as animals, inventory, and vehicles.

RF identification (RFID) tag systems have been developed that facilitate monitoring of remote objects. As shown in FIG. 1, a basic RFID system 10 includes two components: an interrogator or reader 12, and a transponder (commonly called an RF tag) 14. The interrogator 12 and RF tag 14 include respective antennas 16, 18. In operation, the interrogator 12 transmits through its antenna 16 a radio frequency interrogation signal 20 to the antenna 18 of the RF tag 14. In response to receiving the interrogation signal 20, the RF tag 14 produces an amplitude-modulated response signal 22 that is transmitted back to the interrogator 12 through the tag antenna 18 by a process known as backscatter.

The conventional RF tag 14 includes an amplitude modulator 24 with a switch 26, such as a MOS transistor, connected between the tag antenna 18 and ground. When the RF tag 14 is activated by the interrogation signal 20, a driver (not shown) creates a modulating signal 28 based on an information code, typically an identification code, stored in a non-volatile memory (not shown) of the RF tag 14. The modulating signal 28 is applied to a control terminal of the switch 26 which causes the switch 26 to alternately open and close. When the switch 26 is open, the tag antenna 18 reflects a portion of the interrogation signal 20 back to the interrogator 12 as a portion 28 of the response signal 22. When the switch 26 is closed, the interrogation signal 20 travels through the switch 26 to ground, without being reflected, thereby creating a null portion 29 of the response signal 22. In other words, the interrogation signal 20 is amplitude-modulated to produce the response signal 22 by alternately reflecting and absorbing the interrogation signal 20 according to the modulating signal 28, which is characteristic of the stored information code. The RF tag 14 could also be modified so that the interrogation signal is reflected when the switch 26 is closed and absorbed when the switch 26 is open. Upon receiving the response signal 22, the interrogator 12 demodulates the response signal 22 to decode the information code represented by the response signal.

The substantial advantage of RFID systems is the non-contact, non-line-of-sight capability of the technology. The interrogator 12 emits the interrogation signal 20 with a range from one inch to one hundred feet or more, depending upon its power output and the radio frequency used. Tags can be read through a variety of substances such as smell, fog, ice, paint, dirt, and other visually and environmentally challenging conditions where bar codes or other optically-read technologies would be useless. RF tags can also be read at remarkable speeds, in most cases responding in less than one hundred milliseconds.

A typical RF tag system 10 will contain a number of RF tags 14 and the interrogator 12. There are three main categories of RF tags. These are beam-powered passive tags, battery-powered semi-passive tags, and active tags. Each operates in fundamentally different ways.

The beam-powered RF tag is often referred to as a passive device because it derives the energy needed for its operation from the interrogation signal beamed at it. The tag rectifies the field and changes the reflective characteristics of the tag itself, creating a change in reflectivity that is seen at the interrogator. A battery-powered semi-passive RFID tag operates in a similar fashion, modulating its RF cross section in order to reflect a delta to the interrogator to develop a communication link. Here, the battery is the source of the tag's operational power. Finally, in the active RF tag, a transmitter is used to create its own radio frequency energy powered by the battery.

The range of communication for such tags varies according to the transmission power of the interrogator 12 and the RF tag 14. Battery-powered tags operating at 2,450 MHz have traditionally been limited to less than ten meters in range. However, devices with sufficient power can reach up to 200 meters in range, depending on the frequency and environmental characteristics.

Conventional continuous wave backscatter RF tag systems utilizing passive (no battery) RF tags require adequate power from the interrogation signal 20 to power the internal circuitry in the RF tag 14 used to amplitude-modulate the response signal 22 back to the interrogator 12. While this is successful for tags that are located in close proximity to an interrogator 12, for example less than three meters, this may be insufficient range for some applications, for example, which require greater than 100 meters.

SUMMARY OF THE INVENTION

An embodiment of the present invention is directed to an RF communication system that employs phase-modulated backscatter signals for RF communication from an RF tag to an interrogator. The interrogator transmits a continuous wave interrogation signal to the RF tag, which based on an information code stored in a memory, phase-modulates the interrogation signal to produce a backscatter response signal that is transmitted back to the interrogator. By employing a phase-modulated backscatter response signal rather than the amplitude-modulated backscatter response signal of prior art systems shown in FIG. 1, the RF communication system is able to reflect much more power from the interrogation signal than is possible using the prior art systems, resulting in a much longer communication range between the interrogator and RF tag.

In one embodiment, the phase modulator structure in the RF tag includes a switch having a control terminal and first and second conduction terminals, the first conduction terminal being coupled to an antenna in the RF tag; a quarter-wavelength stub coupled to the second conduction terminal of the switch; and a driver coupled between the memory and the control terminal of the switch. The driver is structured to produce a modulating signal corresponding to the information code, the modulating signal alternately opening and closing the switch. Opening and closing the switch changes the phase of the response signal by respectively decreasing and increasing the transmission path taken by the interrogation signal before being reflected as the response signal.

In another embodiment, the phase modulator includes a diode coupled to the antenna and a driver coupled between the memory and the diode. The driver again is structured to produce a modulating signal corresponding to the information code, the modulating signal being a variable voltage that modulates an impedance of the diode. By modulating the impedance of the diode, the phase of the response signal reflected by the diode and antenna is modulated.

An embodiment of the invention is also directed to an RF tag and a method that phase-modulates the interrogation signal to produce and transmit the response signal.

DETAILED DESCRIPTION OF THE INVENTION

Figure 2:
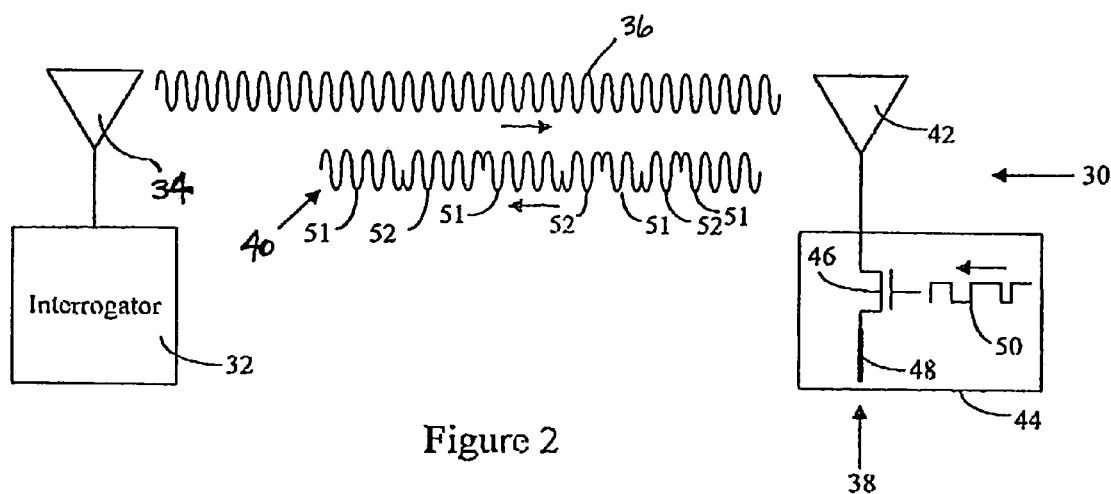
FIG. 2 is a schematic diagram of an RF communication system employing phase-modulated backscatter signals according to an embodiment of the present invention.

As shown in FIG. 2, an embodiment of the present invention is directed to an RF communication system 30 that employs phase-modulated backscatter signals. The RF communication system 30 includes a reader or interrogator 32 that includes an antenna 34 through which the reader transmits a continuous wave interrogation signal 36 to an RF tag 38. Based on an identification code stored in a memory (not shown) of the RF tag 38, the RF tag phase-modulates the interrogation signal 36 to produce a backscatter response signal 40 that is transmitted back to the interrogator 32.

Figure 1:
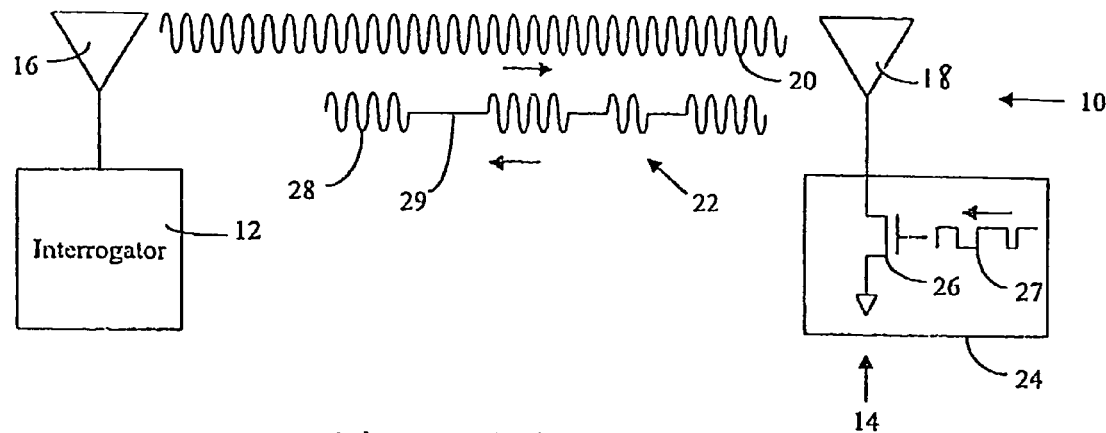
FIG. 1 is a schematic diagram of a prior art RF communication system employing amplitude-modulated backscatter signals.

By employing a phase-modulated backscatter response signal 40 rather than the amplitude-modulated backscatter response signal of the prior art system shown in FIG. 1, the RF communication system 30 is able to reflect much more power from the interrogation signal 36 than is possible using the prior art system of FIG. 1. That is because the RF tag 38 is always reflecting the interrogation signal 36 to produce the response signal 40. In contrast, the amplitude-modulated response signal of the prior art system is only ON essentially half of its transmission, depending on the coding employed, resulting in less power and a lower signal-to-noise ratio. As a result, the RF communication system 30 has a much longer range than the prior art system shown in FIG. 1.

In the embodiment shown in FIG. 2, the RF tag 38 includes an antenna 42 coupled to a phase modulator 44. The phase modulator 44 includes a switch 46 coupled between the antenna 42 and a partial-wavelength stub 48. The switch 46 is shown in FIG. 2 as an N-channel MOS transistor, but it will be understood that a P-channel MOS transistor, a bipolar transistor, or numerous other types of switches could be employed instead. The partial-wavelength stub 48 can be a quarter-wavelength (λ/4) stub, a λ/8 stub, or any other length stub depending upon the amount of phase change desired for the phase modulation performed by the phase modulator 44.

In FIG. 2, a modulating signal 50 is input to a control terminal of the switch 46 to alternately open and close the switch according to an identification code that is stored in a non-volatile memory (not shown) of the RF tag 38. When the modulating signal 50 opens the switch 46, the interrogation signal 36 is received by the antenna 42 and is reflected off of the switch 46 back through the antenna 42 to produce portions 51 of the response signal 40 that are in phase with the interrogation signal 36. When the modulating signal 50 closes the switch 46, the interrogation signal 36 travels through the antenna 42 and switch 46 to the phase changer 48 which reflects the signal back through the switch 46 and antenna 42 to produce portions 52 of the response signal 40 having a different phase than the interrogation signal 36. The different phase is due to the increased signal path through the switch 46 and phase changer 48 in both directions before being reflected back through the antenna 42.

It will be appreciated that the depiction of the RF tag 38 in FIG. 2 does not include such structures as the memory that stores the identification code for the RF tag, and the circuit elements that produce the modulating signal 50, as those elements are well known in the art and no changes to those structures are needed to implement the RF tag 38. For example, U.S. Pat. No. 4,075,632 to Baldwin et al., which is incorporated by reference herein in its entirety, discusses in detail circuit structures that could be used to produce the modulating signal 50. An implementation of the RF tag 38 employs a quarter-wave dipole antenna as the antenna 42, but any type of antenna could be employed.

The internal structures of the interrogator 32 are not shown in FIG. 2 as no changes are needed to known prior art readers for implementation of the RF communication system 30. For example, the interrogator 32 can be the multichannel homodyne receiver described in U.S. Pat. No. 4,360,810 to Landt, which is incorporated by reference herein in its entirety.

Figure 3A:
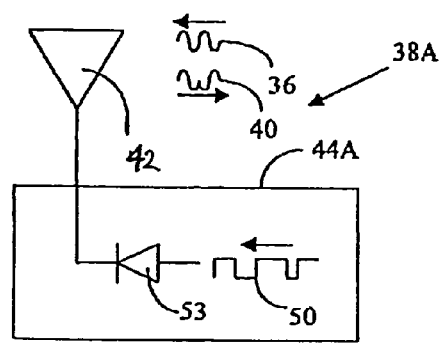
FIG. 3A is a schematic diagram of an RF tag for employment with the RF communication system shown in FIG. 2.

Shown in FIG. 3A is an alternate RF tag 38A that could be employed in the RF communication system 30 in place of the RF tag 38 shown in FIG. 2. The RF tag 38A includes an alternate phase modulator 44A coupled to the same antenna 42 as in the RF tag 38. The phase modulator 44A includes a diode 53 that is coupled at one end to the antenna 42 and at an opposite end to the driver (not shown) that drives the diode 53 with the modulating signal 50.

Figure 3B:
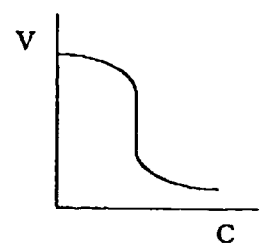
FIG. 3B is a graph showing the voltage-capacitance relationship for a diode used in the embodiment shown in FIG. 3A.

The operation of the phase modulator 44A can be understood with respect to FIG. 3B which shows the voltage to capacitance relationship of the diode 53. FIG. 3B shows that when the voltage input into the diode 53 is relatively high, the capacitance of the diode is low and when the voltage is at a relatively low level, then the capacitance of the diode 53 is high. Such changes in capacitance of the diode 53 based on the changing voltage of the modulating signal 50 causes phase changes in the response signal 40 compared to the interrogation signal 36. It will be recognized that any number of diodes could be employed in addition to the diode 53 and the diodes could be biased in either direction.

Figure 4:
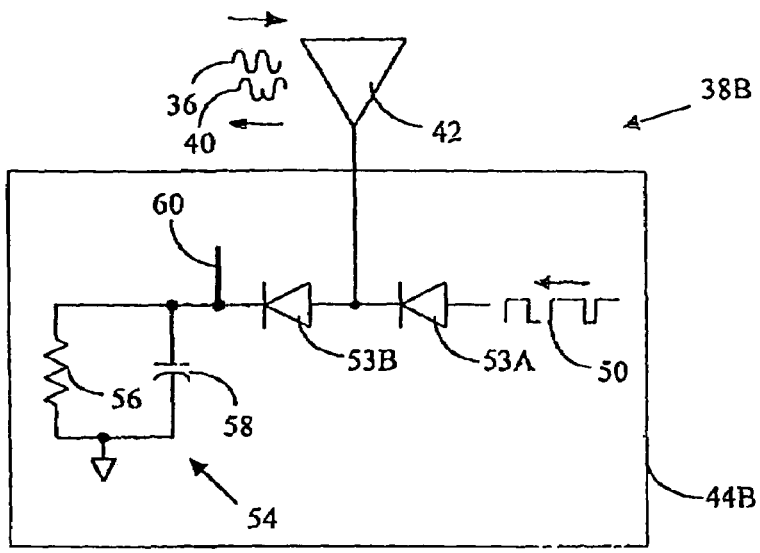
FIG. 4 is an alternate embodiment of an RF tag that can be employed in the RF communication system shown in FIG. 2.

Shown in FIG. 4 is an another RF tag 38B that could be employed in the RF communication system 30 in place of the RF tag 38 shown in FIG. 2. The RF tag 38B includes an alternate phase modulator 44B coupled to the same antenna 42 as in the RF tag 38. The phase modulator 44B includes a first diode 53A that is coupled at one end to the antenna 42 and at an opposite end to the driver (not shown) that drives the first diode 53A with the modulating signal 50. The phase modulator 44B also includes a second diode 53B coupled between the antenna 42 and a parallel RC circuit 54 comprised of a resistor 56 connected in parallel with a capacitor 58 between the second diode 53B and ground. A quarter-wavelength stub 60 is also coupled to the node between the second diode 53B and the parallel RC circuit 54. The concepts underlying the operation of the phase modulator 44B are identical to those discussed above with respect to the phase modulators 44, 44A of FIGS. 2, 3A.

Figure 5:
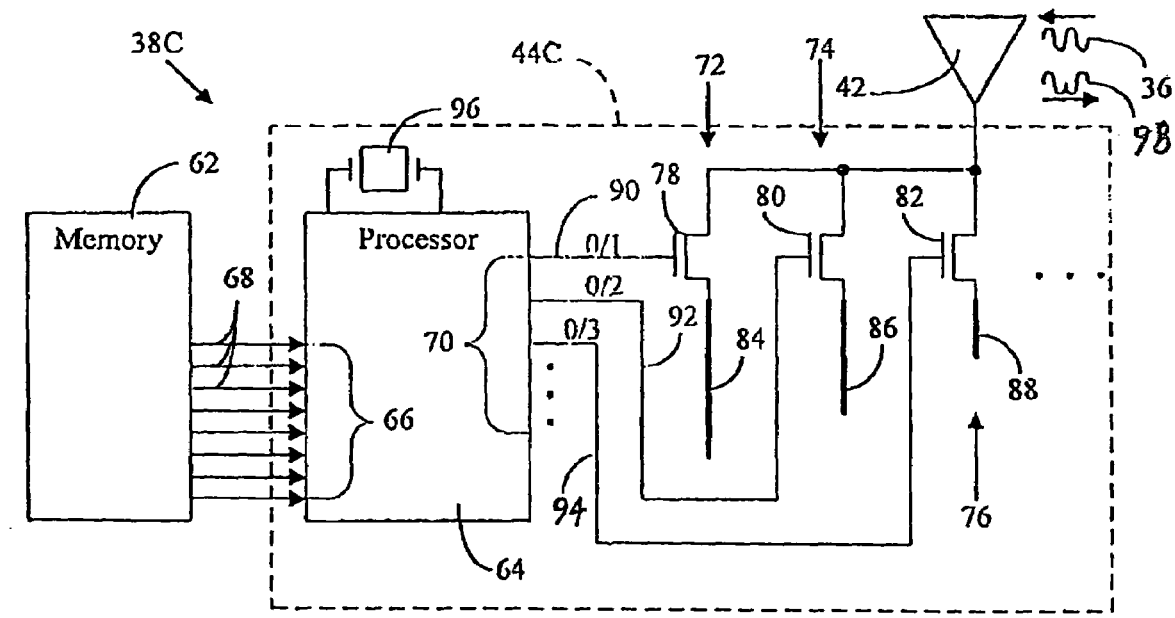
FIG. 5 is a circuit diagram of an alternate RF tag that can be employed in the RF communication system shown in FIG. 2.

Shown in FIG. 5 is an another RF tag 38C that could be employed in the RF communication system 30 in place of the RF tag 38 shown in FIG. 2. The RF tag 38C includes an alternate phase modulator 44C coupled between a memory 62 and the same antenna 42 as in the RF tag 38. In contrast to the phase modulators 44, 44A, 44B of FIGS. 2–4, the phase modulator 44C produces a response signal 98 that includes four different phases: 0°, 45°, 90°, and 135° ($\lambda$, $\lambda/8$, $\lambda/4$, $3\lambda/8$).

The phase modulator 44C includes a processor 64, such as a general purpose microprocessor, having a first input/output (I/O) port 66 coupled to the memory by a plurality of individual bit lines 68 and a second I/O port 70. The phase modulator 44C also includes first, second, and third phase changers 72, 74, 76 having respective switches 78, 80, 82 and respective partial-wavelength stubs 84, 86, 88. The second I/O port 70 of the processor 64 is coupled to the first, second, and third switches 78, 80, 82 by first, second, and third bit lines 90, 92, 94, respectively. In one embodiment, the partial-wavelength stubs 84, 86, 88 are three-eighth-, quarter-, and eighth-wavelength stubs, respectively. The switches 78–82 are shown as MOS transistors, but numerous other known switches could be employed instead. The processor 64 is clocked by an oscillator 96 to provide for the timing of the operations to be discussed below.

Stored in the memory 62 is an information code, such as an identification code that identifies the RF tag 38C and/or an object to which the RF tag is attached. Alternatively, the information code could represent numerous other pieces of information, such as the environmental conditions surrounding the RF tag 38C, inventory information associated with the RF tag, or information that was previously written to the RF tag before or after the RF tag was placed into service. The memory 62 can be implemented with any type of memory, but preferably is non-volatile memory so that the information code is not lost when power is lost.

In response to being activated by the interrogation signal 36, the processor 64 retrieves the information code from the memory 62. Based on the information code retrieved, the processor 64 modulates the interrogation signal 36 by alternately selecting one or none of the switches 78–82. If none of the switches 78–82 are selected, then a portion of the interrogation signal 36 is reflected with no change in phase. If the first switch 78 is selected, then the portion of the interrogation signal 36 is reflected with a ⅜-wavelength (135°) phase change; if the second switch 80 is selected, the phase change is ¼-wavelength (90°); and if the third switch 82 is selected, the phase change is ⅛-wavelength (45°). String together the different phase portions (including the no phase change portion) at a modulating frequency determined by the oscillator 96 produces a response signal 98 that is transmitted back to the interrogator.

One large advantage provided by the RF tag 38C shown in FIG. 5 is that the information stored in the memory 62 can be transmitted on the response signal 98 parallel or multi-bit form. For example, to transmit the number 3, the processor can simply select the third switch 82 to transmit a portion of the response signal 98 with a phase change of 45° compared to the interrogation signal 36. In contrast, to transmit the same number 3 using the prior art RF tag 10 of FIG. 1, one would transmit two portions representing ones (3=11 in binary). As a result, the RF tag 38C can transmit twice as much information as the prior art RF tag 10 within the same signal period.

It should be appreciated that the structure of the RF tag 38C of FIG. 5 is exemplary only, and numerous alterations can be made without departing from the invention. Theoretically, an infinite number of different phases can be incorporated into the response signal 98, although as a practical matter, it may be very difficult to distinguish more than about 32 different phases using current technology. However, the invention is intended to be broad enough to include any number of different phases. In addition, rather than employing plural discrete phase changers 72–76, one could employ a known, commercially available phase modulator chip to provide the respective phase changes.

CLOSURE

In view of the foregoing, it will be appreciated that the RF tags discussed herein provide important advantages over prior art RF tags. In particular, phase modulating the interrogation signals produces a stronger response signals with higher signal to noise ratios than the amplitude-modulating prior art tags. In addition, phase modulation allows plural bits of information to be transmitted in the same signal space as the prior art tags. As a result, the RF tags of the present invention provide faster information exchange over much longer distances than the prior art tags.

Finally it will be clear that many modifications and variants may be introduced to the inventive embodiments described and illustrated herein, all of which come within the scope of the invention as defined in the accompanying claims.

We claim:

1. A radio frequency transponder, comprising:
  an antenna to receive an interrogation signal;
  a memory to store an information code; and
  a phase modulator having:
    a first diode having first and second ends, the second end coupled to the antenna;
    a second diode having first and second ends, the first end coupled to the antenna and the second end of the first diode;
    a stub coupled to the second end of the second diode;
    a parallel RC circuit coupled between the stub and a reference voltage; and
    a driver coupled between the memory and the first end of the first diode, the driver structured to produce a modulating signal corresponding to the information code, the transponder configured to return a backscatter response signal having a substantially constant power level.

2. A radio frequency transponder, comprising:
  an antenna to receive an interrogation signal;
  a memory that stores an information code; and
  a phase modulator structured to produce a response signal having a substantially constant power level according to the information code, the response signal containing a plurality of phases in addition to a phase that is substantially identical to a phase of the interrogation signal, wherein the phase modulator includes first and second phase changers that produce in the response signal respective first and second phases that are each different than a phase of the interrogation signal.

3. The transponder of claim 2 wherein the phase modulator further includes a third phase changer that produces in the response signal a third phase that is different than the phase of the interrogation signal, each of the phase changers including a switch coupled between the antenna and a stub.

4. A radio frequency communications system, comprising:
an interrogator to transmit a radio frequency interrogation signal and to receive a backscatter response signal; and
a transponder to return a phase-modulated response signal having a substantially constant power level, the transponder comprising:
an antenna to receive the interrogation signal and to transmit the response signal;
a first diode having an anode and a cathode, the cathode of the first diode coupled to the antenna;
a second diode having an anode and a cathode, the anode of the second diode coupled to the antenna and to the cathode of the of the first diode;
a quarter-wavelength stub coupled to the cathode of the second diode;
a parallel RC circuit coupled between the stub and a reference voltage; and
a driver coupled between the memory and the anode of the first diode, the driver structured to produce a modulating signal corresponding to the information code.

5. A radio frequency communication system, comprising:
an interrogator to transmit a radio frequency interrogation signal; and
a transponder to receive the interrogation signal and to return a response signal having a substantially constant power level, the transponder comprising:
a memory that stores an information code; and
a phase modulator structured to include in the response signal a plurality of phases in addition to a phase that is substantially identical to a phase of the interrogation signal, wherein the phase modulator includes first and second phase changers that produce in the response signal respective first and second phases that are each different than a phase of the interrogation signal.

6. The communication system of claim 5 wherein the transponder includes an antenna that receives the interrogation signal and returns the response signal and the phase modulator further includes a third phase changer that produces in the response signal a third phase that is different than the phase of the interrogation signal, each of the phase changers include a switch coupled between the antenna and a stub.

7. A radio frequency transponder, comprising:
means for receiving a radio frequency interrogation signal from an interrogator;
means for phase modulating the interrogation signal according to an information code to produce a response signal;
means for returning the response signal, wherein the phase modulating means includes driver means for producing and applying to a variable impedance means a modulating signal corresponding to the information code, the modulating signal comprising a variable voltage that modulates an impedance of the variable impedance means to phase modulate the interrogation signal and thereby produce the response signal, the variable impedance means coupled between the driver means and the means for transmitting the response signal, the variable impedance means comprising:
a first diode coupled to the transmitting means;
a second diode coupled to the transmitting means and the first diode;
a quarter-wavelength stub coupled to the second diode;
a parallel RC circuit coupled between the stub and a reference voltage; and
a driver means coupled to the first diode, the driver means for producing and applying to the first diode a modulating signal corresponding to the information code.

8. A radio frequency transponder, comprising:
means for receiving a radio frequency interrogation signal from an interrogator;
means for phase modulating the interrogation signal according to an information code to produce a response signal; and
means for returning the response signal, wherein the phase modulating means include first, second and third phase changers that produce in the response signal respective first, second and third phases that are each different than a phase of the interrogation signal.

9. The transponder of claim 8 wherein each of the phase changers comprise a switch coupled between the antenna and a stub.

10. The radio frequency transponder of claim 8 wherein the means for phase modulating the interrogation signal according to an information code to produce a response signal is configured to product a response signal of a substantially constant power level.

* * * * *

UNITED STATES PATENT AND TRADEMARK OFFICE
CERTIFICATE OF CORRECTION

PATENT NO. : 7,180,402 B2  Page 1 of 1
APPLICATION NO. : 10/928712
DATED : February 20, 2007
INVENTOR(S) : Curtis Lee Carrender et al.

It is certified that error appears in the above-identified patent and that said Letters Patent is hereby corrected as shown below:

Column 7
Line 22, "of the of the" should read as --of the--.

Signed and Sealed this

Twelfth Day of August, 2008

JON W. DUDAS
*Director of the United States Patent and Trademark Office*